US012717084B2

(12) United States Patent
Li et al.

(10) Patent No.: US 12,717,084 B2
(45) Date of Patent: Aug. 25, 2026

(54) LENS FABRICATION OF OPTICAL FIBERS WITH LASER EXPOSURE

(71) Applicant: CORNING RESEARCH & DEVELOPMENT CORPORATION, Corning, NY (US)

(72) Inventors: Ming-Jun Li, Horseheads, NY (US); Ying Liu, Painted Post, NY (US); Lei Yuan, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 456 days.

(21) Appl. No.: 18/128,415

(22) Filed: Mar. 30, 2023

(65) Prior Publication Data

US 2023/0324614 A1 Oct. 12, 2023

Related U.S. Application Data

(60) Provisional application No. 63/327,827, filed on Apr. 6, 2022.

(51) Int. Cl.
*G02B 6/26* (2006.01)
*G02B 19/00* (2006.01)

(52) U.S. Cl.
CPC ......... *G02B 6/262* (2013.01); *G02B 19/0009* (2013.01); *G02B 19/0047* (2013.01)

(58) Field of Classification Search
CPC . G02B 6/262; G02B 19/0009; G02B 19/0047
See application file for complete search history.

(56) References Cited

U.S. PATENT DOCUMENTS 4,456,330 A * 6/1984 Bludau ................ G02B 6/4203 385/33
4,737,006 A * 4/1988 Warbrick ........... G02B 13/0095 356/73.1
5,699,464 A * 12/1997 Marcuse ............. G02B 6/4203 385/35
6,594,419 B2 * 7/2003 Ukrainczyk ........... G02B 6/255 385/33
6,963,682 B2 * 11/2005 Bhagavatula ........ G02B 6/4202 385/124
7,221,839 B2 * 5/2007 Ohta .................... G02B 6/4209 385/33
9,411,105 B2 * 8/2016 Anderson ............. G02B 6/124

(Continued)

OTHER PUBLICATIONS

Lee et al., Lensed fiber probes designed as an alternative to bulk probes in optical coherence tomography, Appl. Opt. 47, 1510-1516 (2008) (Year: 2008).*

(Continued)

*Primary Examiner* — Peter Radkowski
(74) *Attorney, Agent, or Firm* — Michael E. Carroll, Jr.

(57) ABSTRACT

The present disclosure relates to a lensed optical fiber having a lens applied onto an end face of an optical fiber by laser beam processing. The lens having a radius of curvature that is greater than the diameter of the optical fiber. The lens is applied onto the end face of the optical fiber by laser beam processing in which a laser beam is applied onto the end face of the optical fiber to create the lens. The laser beam has a wavelength ranging between 2.65 microns and 2.85 microns.

10 Claims, 9 Drawing Sheets

(56) References Cited

U.S. PATENT DOCUMENTS

| | | | | |
|---|---|---|---|---|
| 9,784,920 | B2 * | 10/2017 | Anderson | G02B 6/124 |
| 11,426,989 | B2 * | 8/2022 | Logunov | B23K 26/324 |
| 2002/0191911 | A1 * | 12/2002 | Ukrainczyk | G02B 6/255 385/124 |
| 2003/0165292 | A1 * | 9/2003 | Bhagavatula | G02B 6/4203 385/33 |
| 2005/0008310 | A1 * | 1/2005 | Ohta | G02B 6/4216 385/33 |
| 2005/0069257 | A1 * | 3/2005 | Bhagavatula | G02B 6/262 385/33 |
| 2011/0052121 | A1 * | 3/2011 | Zheng | G02B 6/2552 385/35 |
| 2019/0248123 | A1 * | 8/2019 | Logunov | B23K 26/244 |

OTHER PUBLICATIONS

Sohn et al., Laser assisted fabrication of micro-lens array and characterization of their beam shaping property, Applied Surface Science, vol. 479, 2019, pp. 375-385, ISSN 0169-4332, https://doi.org/10.1016/j.apsusc.2019.02.083 (Year: 2019).*

Lim et al., Fabrication of concave micro lens array using laser patterning and isotropic etching, International Journal of Machine Tools and Manufacture, vol. 46, Issue 5, 2006, pp. 552-558, ISSN 0890-6955, https://doi.org/10.1016/j.ijmachtools.2005.06.004 (Year: 2006).*

Le Camus et al., Direct-laser-written integrated mid-IR directional couplers in a BGG glass, Opt. Express 29, 8531-8541 (2021) (Year: 2021).*

Zhang et al., Fabrication of a Chalcogenide Glass Microlens Array for Infrared Laser Beam Homogenization. Materials 2021, 14, 5952. https://doi.org/10.3390/ma14205952 (Year: 2021).*

Zhang et al., Next generation mid-infrared fiber: fluoroindate glass fiber, Opt. Mater. Express 12, 1683-1707 (2022) (Year: 2022).*

Seddon et al., Progress in rare-earth-doped mid-infrared fiber lasers, Opt. Express 18, 26704-26719 (2010) (Year: 2010).*

Lim et al., Fabrication of Lensed Optical Fibers for Biosensing Probes Using CO2 and Femtosecond Lasers. Appl. Sci. 2021, 11, 3738. https://doi.org/10.3390/app11093738 (Year: 2021).*

Gurreri, Michael, et al. "Multi-Fiber, Mt Ferrule Endface Fiber Tip Displacement Model for Physical Contact Interconnects." OFC/NFOEC 2007-2007 Conference on Optical Fiber Communication and the National Fiber Optic Engineers Conference. IEEE, 2007, 12 pages.

Keiron Boyd, et al, "High precision 9.6 μm CO2 laser end-face processing of optical fibres," Optics Express, vol. 23, No. 11. 2015, 7 pages.

Orun et al., "Polishing of optical fibers using a CO2 laser." SIOEL'99: Sixth Symposium on Optoelectronics. vol. 4068. International Society for Optics and Photonics, 2000, 7 pages.

U. C. Paek and A. L. Weaver, "Formation of a Spherical Lens at Optical Fiber Ends with a CO2 Laser," Applied Optics, vol. 14 No. 2, Feb. 1975, 5 pages.

Xinlei Zhou, et al., "Loss Analysis of Physical Contact Fiber-Optic Connector Induced by the Endface Geometry and the Contact Force," Opt. Eng. 55(4), 046107 (2016), 9 pages.

Yang, Steven T., et al. "Comparing the Use of Mid-Infrared Versus Far-Infrared Lasers for Mitigating Damage Growth on Fused Silica." Applied Optics 49.14 (2010): pp. 2606-2616.

* cited by examiner 154
151
150
150A
154A

LENS FABRICATION OF OPTICAL FIBERS WITH LASER EXPOSURE

CROSS-REFERENCE TO RELATED APPLICATIONS

This application claims the benefit of priority of U.S. Provisional Application Ser. No. 63/327,827, filed Apr. 6, 2022, the content of which is relied upon and incorporated herein by reference in its entirety.

FIELD OF THE DISCLOSURE

This disclosure relates to assembling lensed optical fibers and more particularly, to assembling lensed optical fibers with laser exposure.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables.

The growing demand for the optical fiber with robust connectors and low insertion continues to drive develop efforts toward innovation in production and cost reduction per termination. High insertion losses of fiber-to-fiber, fiber to chip, and fiber-to-server are often encountered at the connections where sub micrometer accurate alignment and strict end face finishing quality are needed. Commonly used connecting and coupling methods include physical contact connection and expanded beam (EB) connection.

In conventional physical contact connection, very tightly controlled termination, polishing and metrology procedures are required which are a majority of the cost of traditional multi-fiber interconnects. A time consuming and costly step is mechanical polishing of fiber end face. In some instances, lasers are used for polishing and reflow of the initial cleaved fiber end face instead of mechanical polishing, such as, $CO_2$ lasers and quantum cascade lasers (QCL). However, both $CO_2$ and QCL lasers have drawbacks—the large residual stress and undesired absorption of $CO_2$ laser close to ferrule leads to cracking and damaging, while, the low absorption of glass material limits the heating effect and efficiency of QCL laser processing.

On the other hand, while traditional physical contact between connectors is suitable for low-loss, high performance applications, they are not optimal for short reach, cost sensitive applications. The use of expanded beam technology, typically lensed-fiber/ferrule, eliminates the need for fiber tip physical contact that ultimately reduces the overall cost of multi-fiber optical cable assembly manufacturing. Improvements in expanded beam technology is desired to provide a solution to the aforementioned drawbacks.

Improvements in the foregoing are desired.

SUMMARY OF THE DISCLOSURE

The present disclosure relates to a lensed optical fiber having a lens applied onto an end face of an optical fiber by laser beam processing. The lens having a radius of curvature that is greater than the diameter of the optical fiber. The lens is applied onto the end face of the optical fiber by laser beam processing in which a laser beam is applied onto the end face of the optical fiber to create the lens. The laser beam has a wavelength ranging between 2.65 microns and 2.85 microns.

In one embodiment, a lensed connector is provided. The lensed connector comprising: at least one optical fiber comprising an optical fiber diameter and an end face, wherein the end face includes a lens, the lens spanning the optical fiber diameter with a radius of curvature that is greater than the optical fiber diameter; wherein the lens has a hydroxyl concentration ranging between 8 parts per million (ppm) and 700 ppm.

In some embodiments, the lens has a height relative to an interface between an edge of the optical fiber and the lens, the height ranging between 0.1 microns and 50 microns. In some embodiments, the lens has a height H to diameter D1 ratio of at least 1%. In some embodiments, the end face is treated by a laser comprising a wavelength ranging between 2.65 microns and 2.85 microns to create the lens. In some embodiments, the lens has a radius of curvature ranging between 10 millimeters (mm) and 25 mm. In some embodiments, the lens has a ratio of radius of curvature of the lens to the optical fiber diameter, the ratio ranging between 0.8:1 and 100:1. In some embodiments, the lensed connector further comprising: a coreless fiber spliced onto the optical fiber, wherein the lens is applied onto the coreless optical fiber. In some embodiments, the lens has a hydroxyl concentration greater than 13 ppm.

In one embodiment, a method of preparing a lensed connector wherein the lensed connector includes an optical fiber having an optical fiber diameter and an end face is provided. The method comprising: applying a laser beam onto the end face of the optical fiber for creating a lens on the end face of the optical fiber; wherein the laser beam has a wavelength ranging between 2.65 microns and 2.85 microns.

In some embodiments, the lens has a hydroxyl concentration greater than 13 parts per million (ppm). In some embodiments, the laser beam has a power ranging between 1 Watts (W) and 50 W. In some embodiments, the laser beam has a numerical aperture ranging between 0.02 and 0.3. In some embodiments, the laser beam has an exposure time ranging between 0.1 seconds to 10 seconds.

In one embodiment, a laser apparatus configured for making a lensed optical fiber is provided. The laser apparatus comprising: a laser emitting a laser beam; an enclosure box configured to receive the laser beam, the enclosure box comprising a series of lenses; wherein the series of lenses comprises a power attenuation portion and a beam expander portion; a series of mirrors configured to reflect the laser beam in the direction of an optical fiber, the optical fiber having an end face and an optical fiber diameter; and a focusing lens configured to direct the laser beam from the series of mirrors onto the end face of the optical fiber.

In some embodiments, the laser beam has a power ranging between 1 Watt (W) and 50 W. In some embodiments, the laser beam has a numerical aperture ranging between 0.02 and 0.3. In some embodiments, the laser beam has an exposure time ranging between 0.1 seconds to 10 seconds.

In one embodiment, a lensed connector assembly is provided. The lensed connector assembly comprising: a glass substrate comprising a top surface; wherein the top surface is laser treated such that a lens is formed on the top surface, wherein the lens has a radius of curvature greater than a diameter of the lens; wherein the lens has a height ranging between 0.1 microns and 50 microns relative to an interface between the lens and the top surface of the glass substrate.

In some embodiments, the lens has a hydroxyl concentration ranging between 8 parts per million (ppm) and 700 ppm. In some embodiments, the lens has a height to width ratio of at least 1%. In some embodiments, the end face is treated by a laser having a wavelength ranging between 2.65 microns and 2.85 microns for creating the lens. In some embodiments, the lens has a radius of curvature ranging between 100 microns and 25000 microns. In some embodiments, the lens has a ratio of radius of curvature of the lens to a diameter of an optical fiber coupled to the glass substrate, the ratio ranging between 0.8:1 and 100:1. In some embodiments, the lens has a hydroxyl concentration greater than 13 parts per million (ppm).

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to a lensed optical fiber having a lens applied onto an end face of an optical fiber by laser beam processing. The lens having a radius of curvature that is greater than the diameter of the optical fiber. The lens is applied onto the end face of the optical fiber by laser beam processing in which a laser beam is applied onto the end face of the optical fiber to create the lens. The laser beam has a wavelength ranging between 2.65 microns and 2.85 microns.

Figure 1:
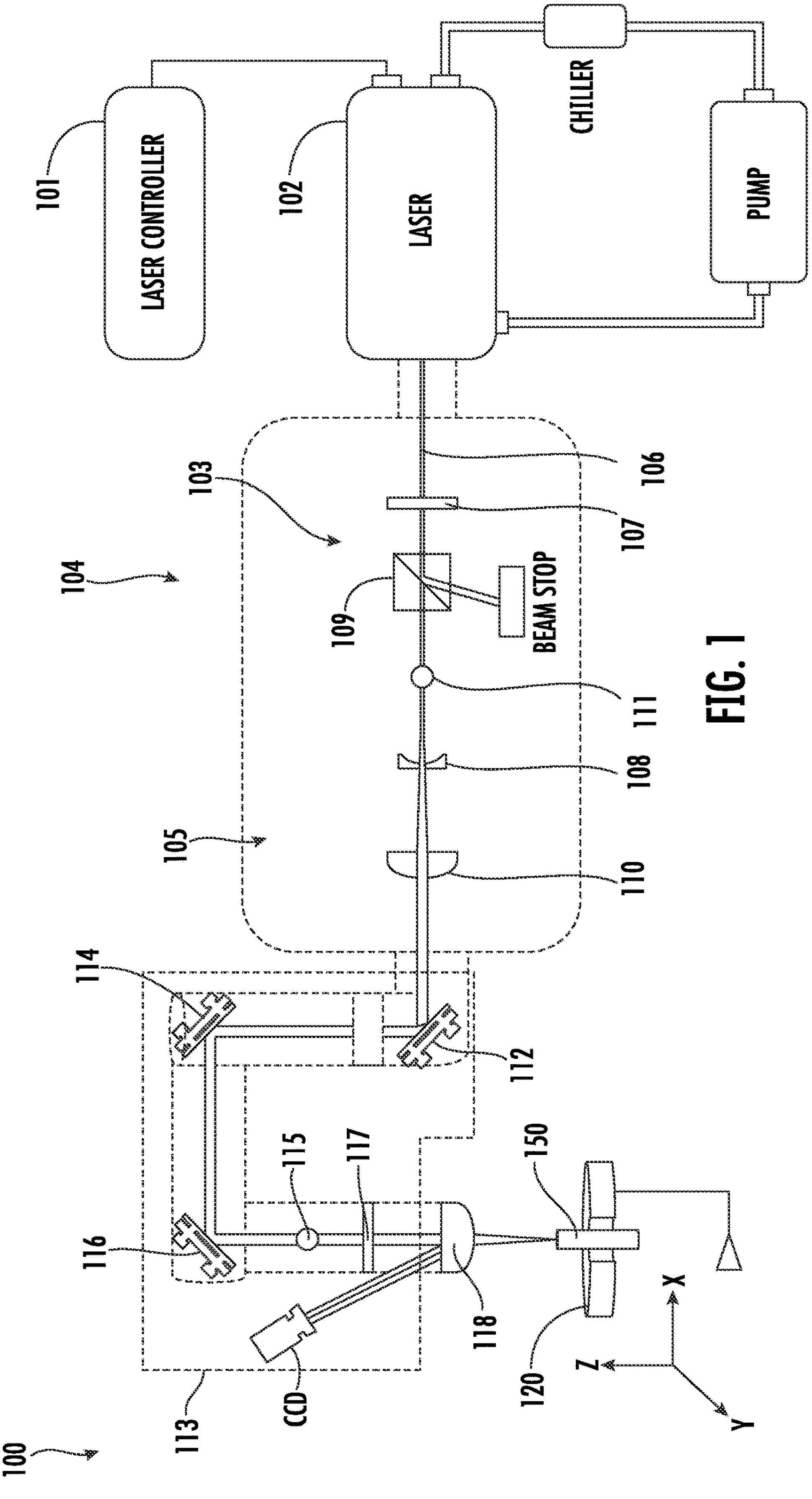
FIG. 1 is a schematic of a laser apparatus used to fabricate a lens onto an end face of an optical fiber in accordance with the present disclosure.
Figures 4A, 4B:
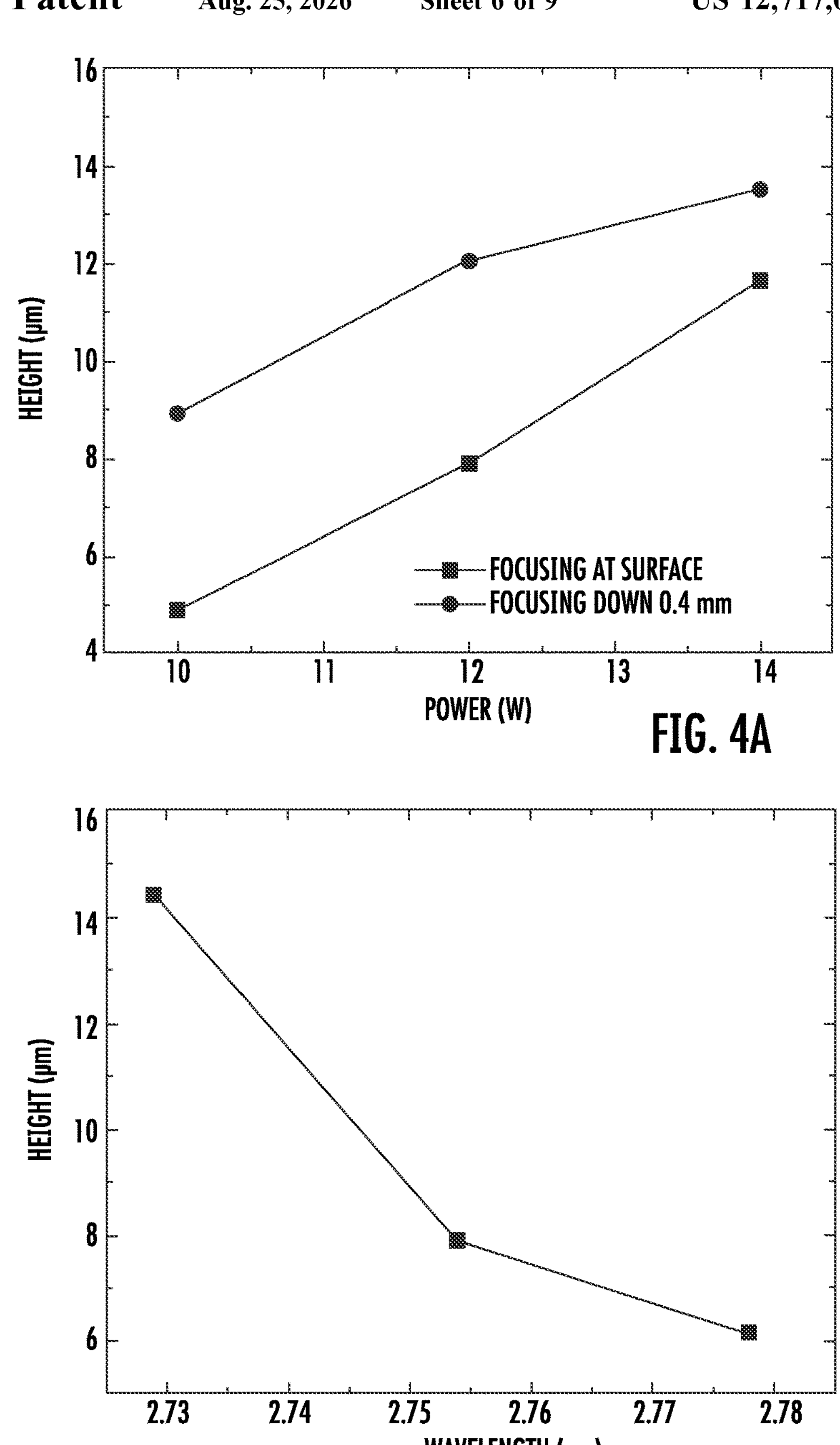
FIGS. 4A and 4B are graphs illustrating height profiles of the lens applied onto the glass substrate as a function of laser power and wavelength, respectively.

Referring first to FIG. 1, a laser apparatus 100 is shown. Laser apparatus 100 is configured to polish an end face 150A of an optical fiber 150 and to fabricate a lens 151 onto end face 150A as discussed in greater detail herein. As shown in FIG. 1, laser apparatus 100 includes a laser 102, an enclosure box 104, a mirror section 113, and a focusing lens 118. Laser 102 is configured to emit a laser beam 106 to treat optical fiber 150 that is seated on stage 120. In some embodiments, laser 102 emits laser beam 106 at a mid-IR wavelength. In some embodiments, laser 102 emits laser beam 106 at a wavelength ranging between 1 micron and 5 microns, between 2 microns and 3 microns, or between 2.65 microns and 2.85 microns. In some embodiments, laser 102 emits laser beam 106 at a power ranging between 1 Watt (W) and 50 W. Referring briefly to FIGS. 4A and 4B, graphs illustrating the height profiles of lens 151 as applied onto a glass substrate as a function of laser power and wavelength, respectively. As shown in FIG. 4A, as power of laser beam 106 is increased, height H of lens 151 increases. As shown in FIG. 4B, laser beam 106 has a peak absorption wavelength, and as the wavelength of laser beam 106 is changed (e.g., increased) relative to the peak absorption wavelength, height H of lens 151 decreases. Moreover, FIGS. 4A and 4B illustrate that the height H of lens 151 can be controlled by varying the power, tuning wavelength, or changing the focusing position of laser beam 106 on/inside glass substrate 125. In some embodiments, laser 102 emits laser beam 106 with a numerical aperture ranging between 0.01 and 1, between 0.02 and 0.5, or between 0.02 and 0.3. In some embodiments, laser 102 emits laser beam 106 at an exposure time ranging between 0.1 seconds to 10 seconds.

As mentioned previously, laser apparatus 100 includes enclosure box 104. In some embodiments, enclosure box includes a purging gas to avoid absorption of water from other components as shown in FIG. 1 in open air. In some embodiments, the purging gas is Nitrogen. However, it is within the scope of the present disclosure that in alternate embodiments, alternate suitable purging gases may be used. As shown in FIG. 1, enclosure box 104 includes a power attenuation section 103 and a beam expander section 105. Power attenuation section 103 is configured to reduce the power of laser beam 106 and to align laser beam 106 into beam expander section 109. Power attenuation section 103 comprises a waveplate 107, a beam splitter 109, and a diaphragm 111. Waveplate 107 is configured to transmit light and modify the polarization state of the light without attenuating, deviating, or displacing laser beam 106. In some embodiments, waveplate 107 is a half wave plate that is configured to shift the polarization direction of linearly polarized light. After passing through waveplate 107, laser beam 106 passes through a beam splitter 109, which is configured to split the laser beam 106. Stated another way, waveplate 107 and beam splitter 109 cooperate to decrease the power of laser beam 107. As shown, beam splitter 109 splits laser beam 106 such that a portion of laser beam 106 is directed to a beam stop and the remaining portion is directed to diaphragm 111. Diaphragm 111 is configured to re-align the remaining portion of laser beam 106 as laser beam 106 passes through diaphragm 111 and onto beam expander portion 105. In some embodiments, a laser controller 101 can be used to adjust the specifications of laser beam 106 (e.g., laser power, wavelength, etc.).

Beam expander section 105 is configured to expand the remaining portion of laser beam 106 downstream within laser apparatus 100. As shown in FIG. 1, beam expander section 105 comprises a series of lenses 108, 110. Lenses 108, 110 are configured to expand laser beam 106. In some embodiments, lens 108 is a concave lens, and lens 110 is a convex lens. However, it is within the scope of the present disclosure that in alternate embodiments, other types of lenses may be used for lenses 108, 110.

Once laser beam 106 moves through enclosure box 104, laser beam 106 moves to mirror section 113. Mirror section 113 is configured to change the direction of laser beam 106 such that laser beam 106 is redirected in the direction of optical fiber 150. With continued reference to FIG. 1, mirror section 113 comprises mirrors 112, 114, 116; diaphragm 115; and waveplate 117. Mirrors 112, 114, 116 are configured to change the direction of laser beam 106 exiting enclosure box 104. As shown, in some embodiments, mirrors 112, 114, 116 change the direction of laser beam 106 by about 90 degrees upon contact with the mirrors. However, it is within the scope of the present disclosure that alternate angle changes of laser beam 106 by mirrors 112, 114, 116 may be used. After passing through mirrors 112, 114, 116, laser beam 106 passes through a diaphragm 115. Like diaphragm 111, diaphragm 115 is configured to re-align the laser beam 106. After passing through diaphragm 115, laser beam 106 passes through a waveplate 117. Like waveplate 107, waveplate 117 is configured to transmit light and modify the polarization state of the light without attenuating, deviating, or displacing laser beam 106. In some embodiments, waveplate 117 is configured to shift the polarization direction of linearly polarized light (e.g., from a linear polarization state to a circular polarization state). However, it is within the scope of the present disclosure that, in alternate embodiments, waveplate 117 may be omitted from laser apparatus 100.

As shown in FIG. 1, after laser beam 106 passes through mirror portion 113, laser beam 106 passes through a focusing lens 118. Focusing lens 118 is configured to redirect and focus laser beam 106 onto an end face 150A of optical fiber 150 that is seated on stage 120. In some embodiments, focusing lens 118 is a convex focusing lens. However, it is within the scope of the present disclosure that, in alternate embodiments, other suitable lens types may be used. In some embodiments, focusing lens 118 has a focal length ranging between 10 mm and 200 mm, between 20 mm and 150 mm, or between 30 mm and 100 mm. In some embodiments, focusing lens 118 has a focal length of about 50 mm. As discussed in greater detail herein, laser beam 106 that is applied onto end face 150A polishes and creates a lens onto end face 150A.

Figure 2:
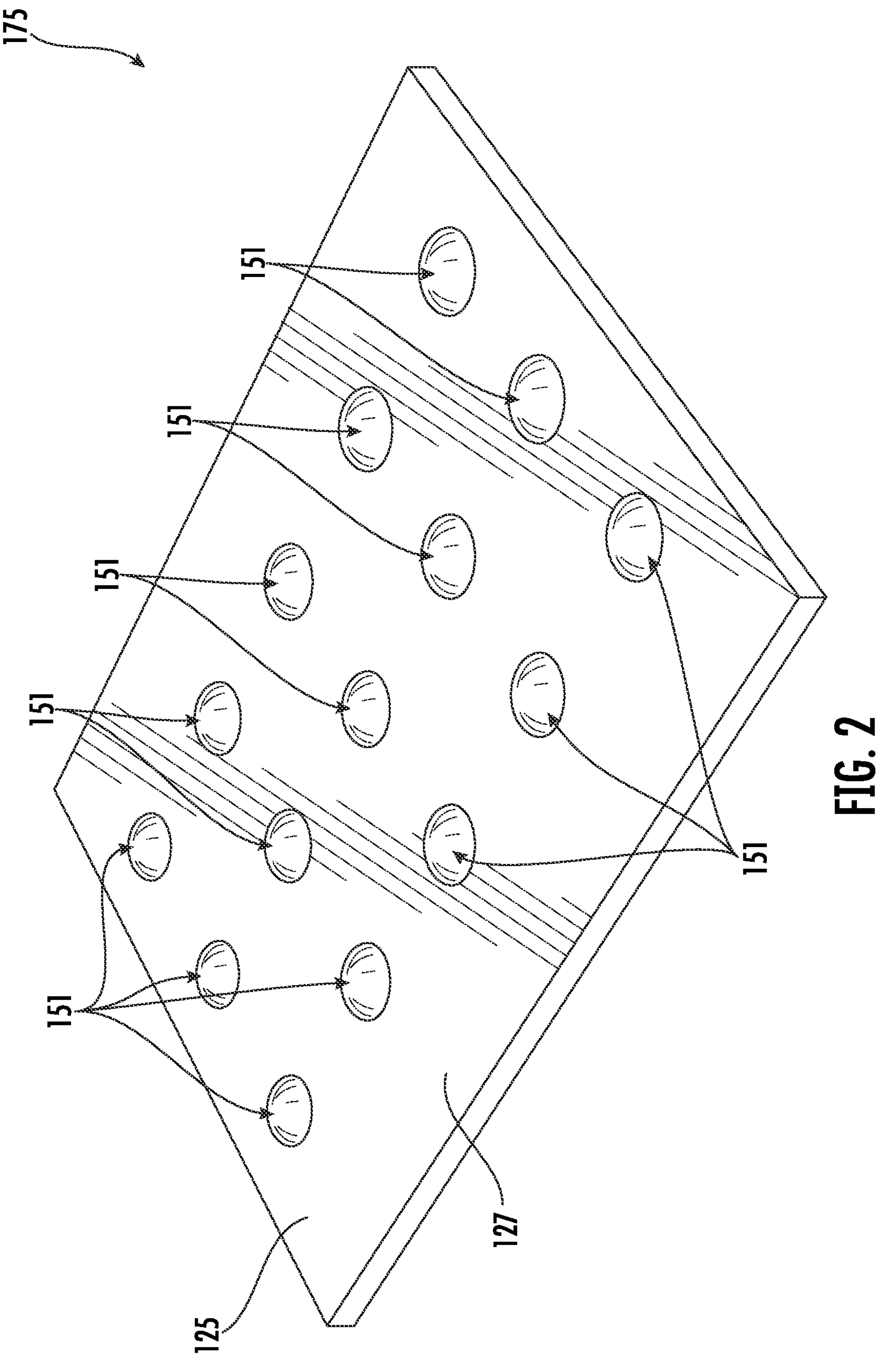
FIG. 2 is a perspective view of a glass substrate onto which laser fabrication treatment is applied and onto which lenses are formed in accordance with the present disclosure.

Referring now to FIG. 2, an embodiment of a lensed connector assembly 175 after undergoing laser treatment by laser apparatus 100 is shown. As shown, a glass substrate 125 is provided where glass substrate 125 is configured to received treatment of laser beam(s) 106 of laser assembly 100 to form lenses 151 on a top surface 127 of glass substrate 125. That is, laser beam 106 is applied onto top surface 127 such that the composition of top surface 127 is altered and a lens 151 is formed.

Figure 3A:
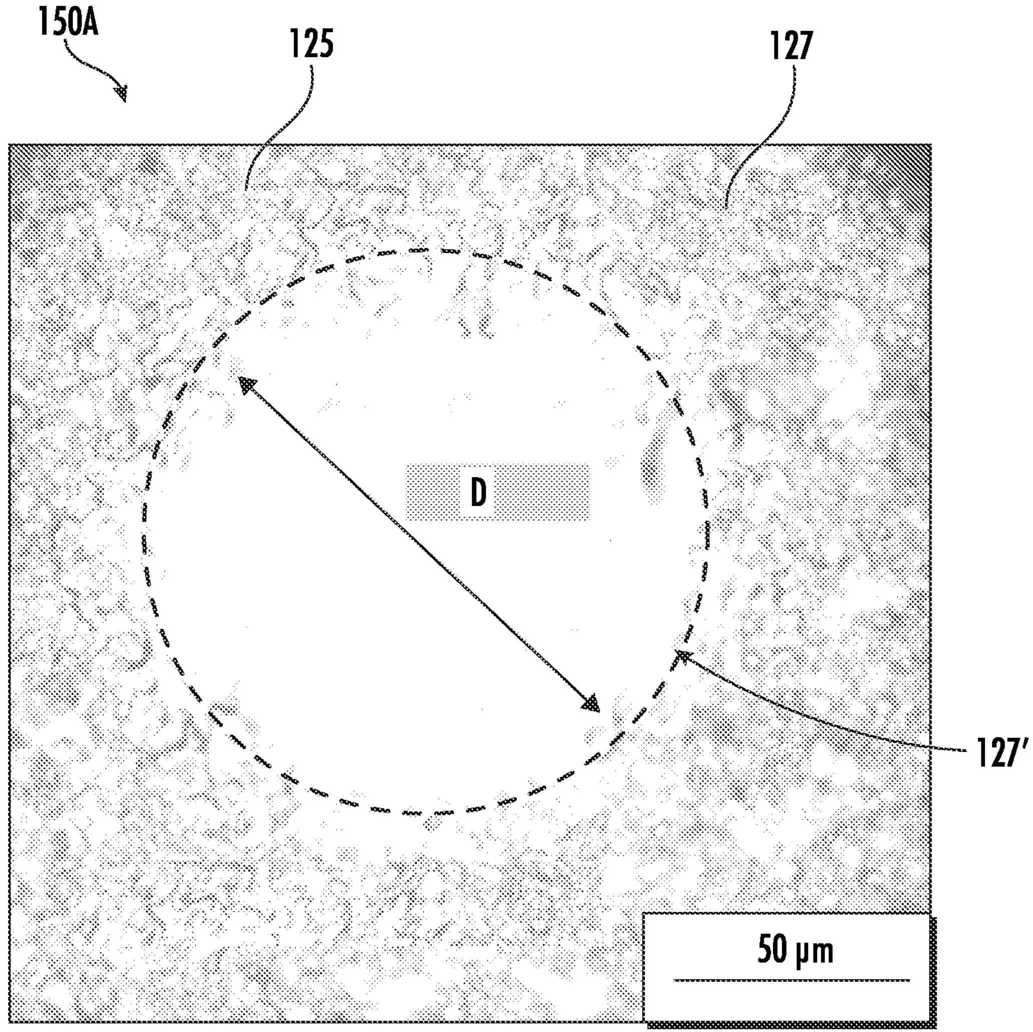
FIG. 3A is a microscopic view of a glass substrate after undergoing laser treatment of the present disclosure where the glass substrate has undergone laser reflow and polish in accordance with the present disclosure.
Figure 3B:
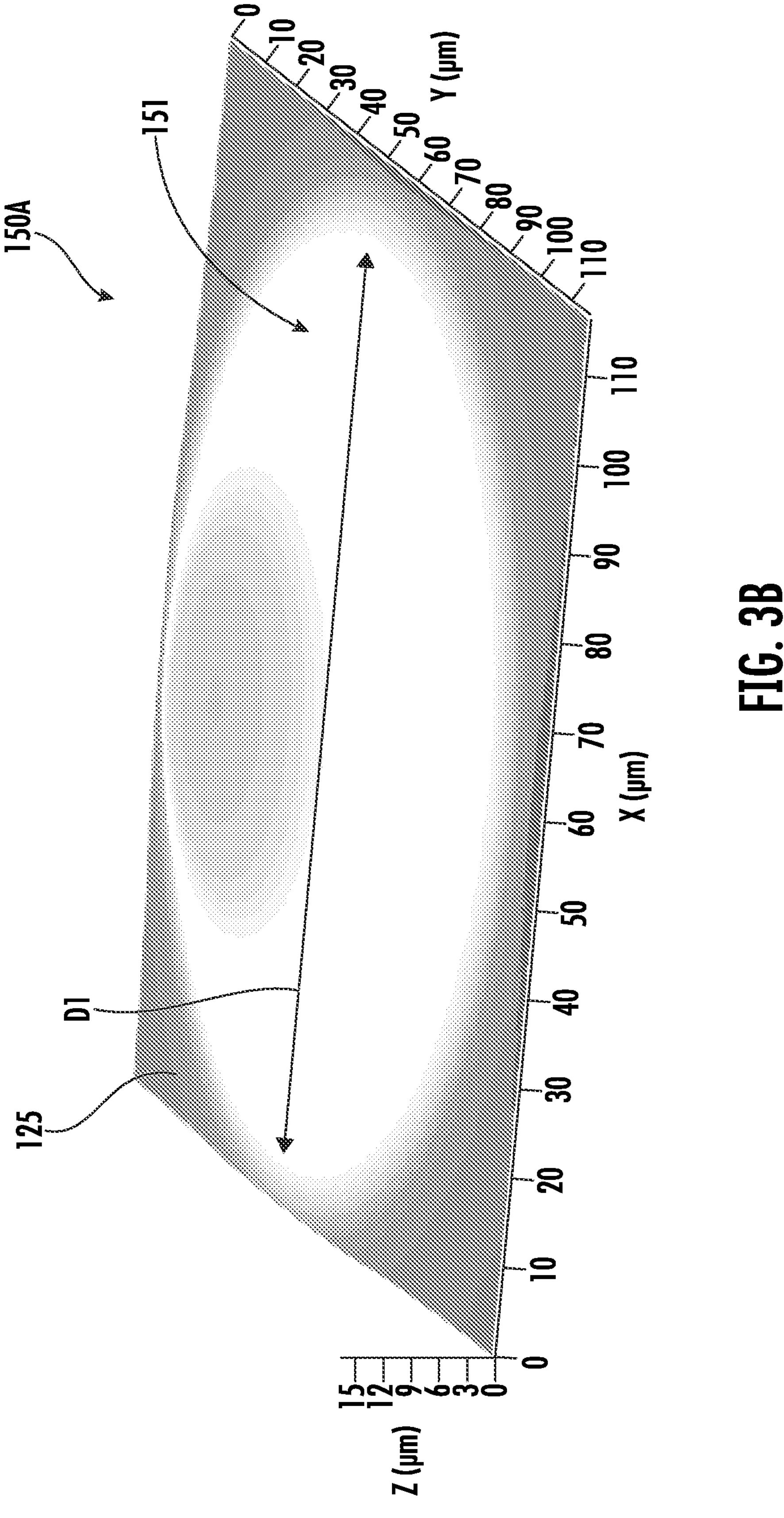
FIGS. 3B and 3C are profiles of a lens as applied onto the glass substrate.
Figure 3C:
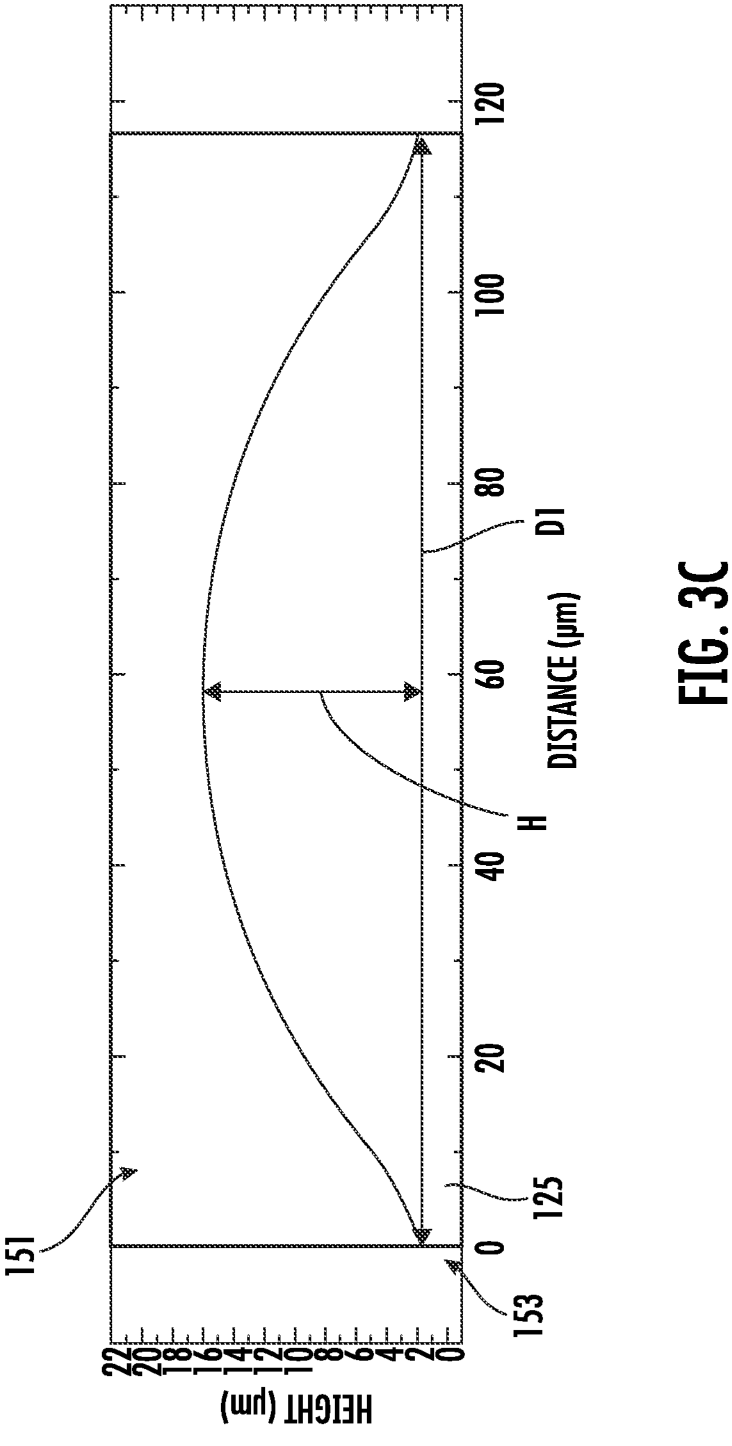

Referring to FIGS. 3A-3C, laser treatment and corresponding data of glass substrate 125 is shown. Referring first to FIG. 3A, glass substrate 125 is irradiated by laser beam 106 under the conditions described herein. Laser treatment of glass substrate 125 yields a smooth and clear top surface 127' relative to top surface 127. That is, top surface 127 of glass substrate 125 is a rough and opaque surface, and after laser treatment of glass substrate 125, the resulting top surface 127' is smooth and clear relative to top surface 127. By applying laser beam 106 under the conditions described herein, melting and reflow of surface 127' has a diameter D. In some embodiments, surface 127' has a diameter D ranging between 100 microns and 125 microns, between 105 microns and 125 microns, or between 110 microns and 125 microns. In some embodiments, surface 127' has a diameter D of about 115 microns. Advantageously, such laser treatment can be used for large area polishing of facets in certain applications (e.g., lensed connector applications).

Figure 5A:
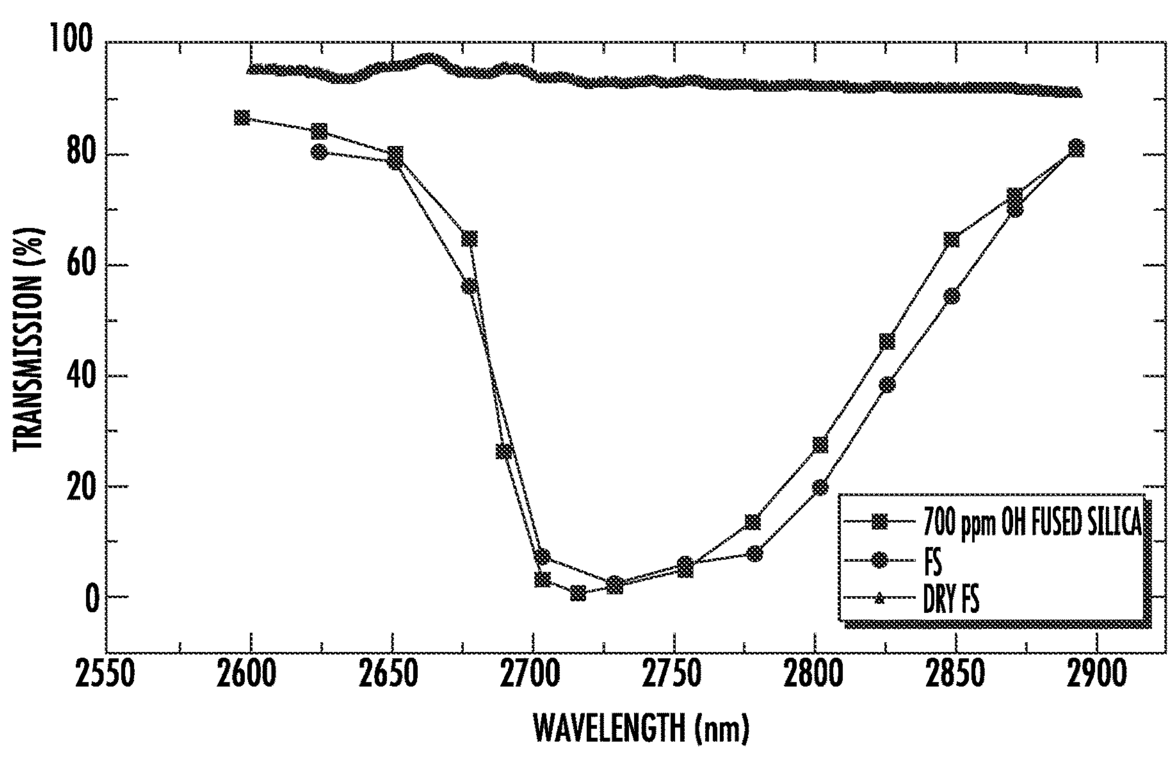
FIGS. 5A and 5B are graphs illustrating transmission and absorbance profiles as a function of laser wavelengths, respectively.
Figure 5B:
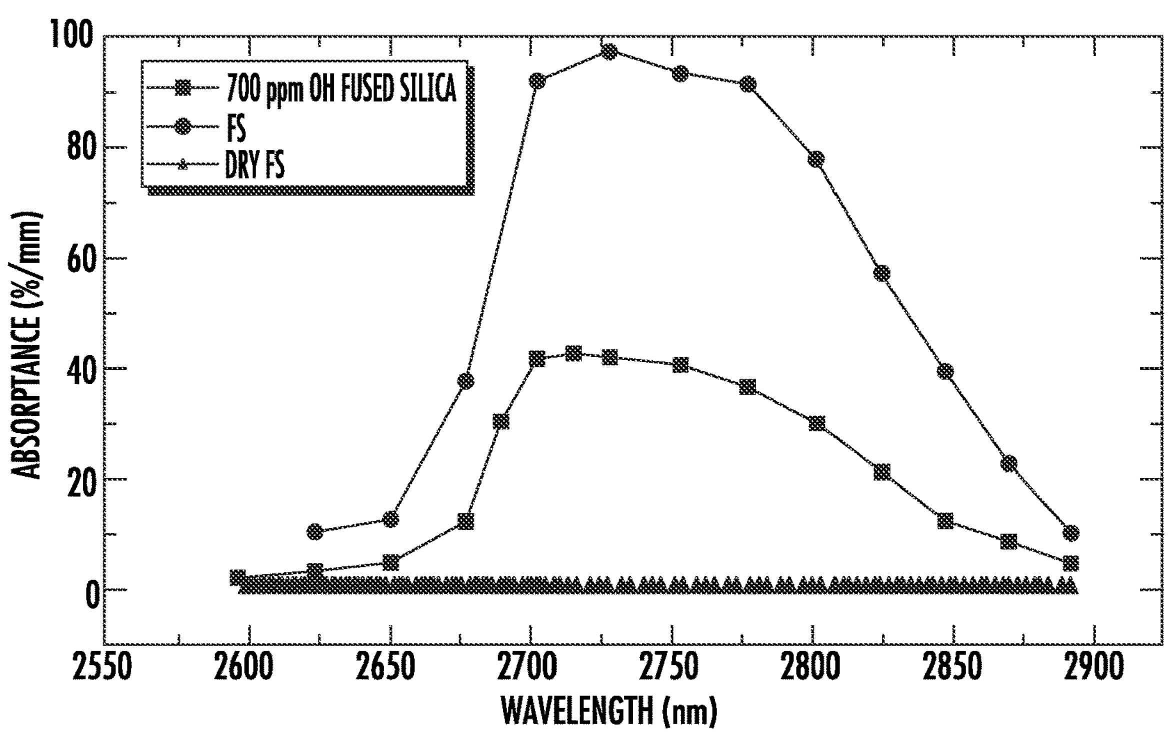

Referring now to FIGS. 3B and 3C, a lens 151 that is formed on glass substrate 125 is shown. In particular, lens 151 is formed on glass substrate 125 after laser treatment of glass substrate 125 under the conditions described herein. As shown, lens 151 has a height H and a diameter D1. In some embodiments, height H of lens 151 ranges between 0.1 microns and 50 microns, between 10 microns and 25 microns, between 10 microns and 20 microns, or between 10 microns and 15 microns relative to an interface 153 between glass substrate 125 and lens 151. In some embodiments, lens 151 has a height H ranging between 0.1 microns and 0.5 microns, between 0.1 microns and 0.3 microns, or between 0.1 microns and 0.2 microns relative to an interface 153 between glass substrate 125 and lens 151 for physical contact connector applications. In some embodiments, lens 151 has a height H ranging between 10 microns and 20 microns or between 15 microns and 20 microns relative to an interface 153 between glass substrate 125 and lens 151 for non-physical contact (e.g., lensed) connector applications. In some embodiments, diameter D1 of lens 151 ranges between 100 microns and 125 microns, between 105 microns and 125 microns, or between 110 microns and 125 microns. In some embodiments, lens 151 has a height H to diameter D1 ratio of at least 1%. Stated another way, in some embodiments, lens 151 has a height H that is at least 1% of the diameter D1 of lens 151 relative to an interface 153 between glass substrate 125 and lens 151. In some embodiments, diameter D1 corresponds to the diameter of the optical fiber 150. In some embodiments, lens 151 comprises a hydroxyl concentration due to treatment of various glass compositions with varying hydroxyl concentrations (e.g., bulk fused silica glasses) with mid IR wavelength laser beam(s) 106. In some embodiments and with reference to FIGS. 5A and 5B, the hydroxyl concentration of lens 151 ranges between 8 parts per million (ppm) and 1200 ppm, between 10 ppm and 1100 ppm, or between 13 ppm and 1000 ppm. As shown in FIG. 5B, the absorbance per millimeter increased with hydroxyl concentration at a wavelength in the range of 2.7 microns to 2.8 microns. Similarly, as shown in FIG. 5A, the transmission of glass substrate 125 decreased with hydroxyl concentration at a wavelength in the range of 2.7 microns to 2.8 microns. As discussed herein, by selecting the laser wavelength and glass composition (hydroxyl content), the laser absorption level can be controlled, leading to designed and controlled morphology of the raised features on fiber end face through laser induced heating, reflow and swelling. In some embodiments, the hydroxyl concentration of lens 151 greater than 13 ppm. The above description in regards to the properties and composition of lens 151 applies to an optical fiber 150 with or without a coreless fiber 154 as discussed herein.

Lens 151, as formed onto glass substrate 125, has a rounded shape and has a radius of curvature as discussed herein. In some embodiments, lens 151 has a radius of curvature ranging between 100 microns and 25000 microns, between 100 microns and 10000 microns, or between 10000 microns and 25000 microns. In some embodiments, lens 151 has a radius of curvature that is greater than a diameter of optical fiber 150 when optical fiber 150 is coupled to glass substrate 125. A radius of curvature greater than a diameter of optical fiber 150 enables mating of lensed connectors where the connectors are spaced apart from each other and light is transmitted through the mated connectors. In some embodiments, lens 151 has a ratio of radius of curvature of lens 151 to the diameter of optical fiber 150 (when optical fiber 150 is coupled to glass substrate 125) where the ratio ranges between 0.8:1 and 100:1.

Figure 6A:
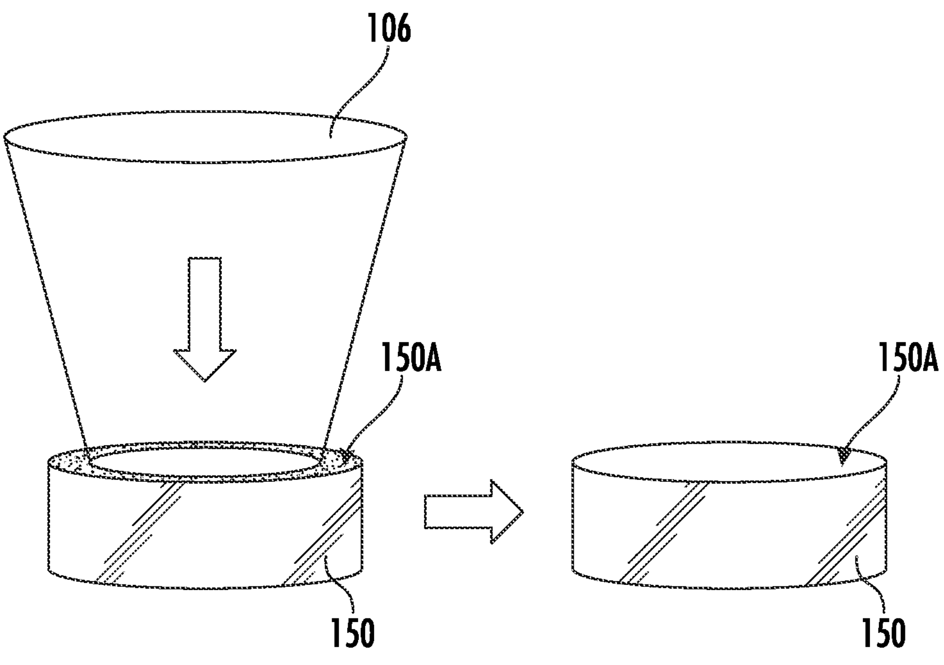
FIGS. 6A and 6B are perspective views of laser polishing the end face of the optical fiber and laser beam treating the optical fiber to create the lens onto the end face, respectively.
Figure 6B:
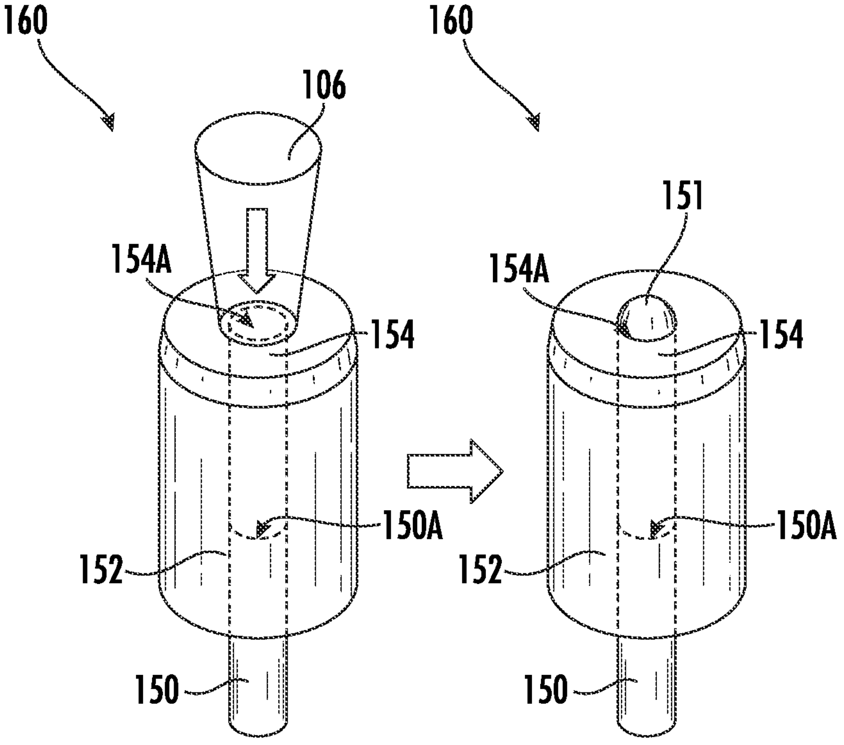

In some embodiments, laser treatment by laser apparatus 100 can be applied onto an optical fiber 150. Referring now to FIGS. 6A and 6B, perspective views of laser treatment of optical fiber 150 is shown. In particular, FIG. 6A shows initial polishing of end face 150A of optical fiber 150, and FIG. 6B shows formation of lens 150 onto an optical fiber 150. Referring first to FIG. 6A, laser beam 106 is applied onto end face 150A of optical fiber 150. In particular, with reference to FIG. 1, optical fiber 150 is placed and held onto stage 120 where laser beam 106, as emitted by laser 102, is applied onto end face 150A. Laser beam 106 can be tuned such that the wavelength can be adjusted depending on the application for optical fiber 150. In some embodiments, laser apparatus is configured such that laser beam 106 has a wavelength ranging between 1 micron and 5 microns, between 2 microns and 3 microns or between 2.65 microns and 2.85 microns. When applied onto end face 150A of optical fiber 150, laser beam 106 with these wavelengths can treat end face 150A such that heating, reflow, and polishing of end face 150A can be achieved without cracking optical fiber 150 or ferrule 152 (FIG. 6B) as shown in FIG. 6A where the rough surface of end face 150A has changed to a smooth surface after treatment by laser beam 106.

Figures 7A, 7B:
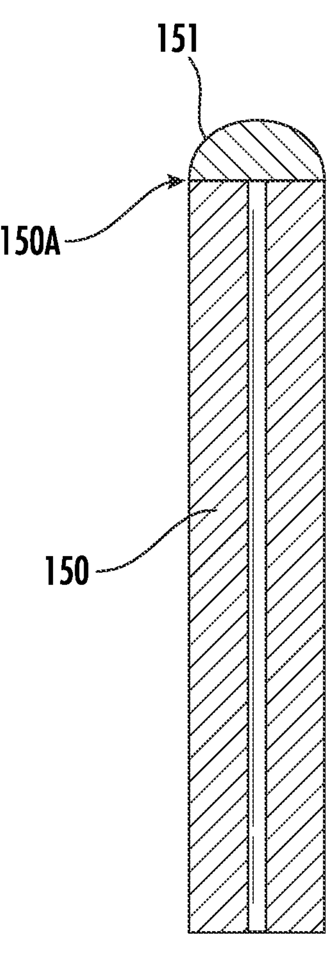
FIGS. 7A and 7B are perspective views of various embodiments of optical fibers that have lenses applied onto the respective end faces in accordance with the present disclosure.

Referring now to FIG. 6B, a connector 160 is shown. Connector 160 includes optical fiber 150 and a ferrule 152 that houses at least a portion of optical fiber 150. In some embodiments, as shown in FIG. 6B and FIG. 7B, optical fiber 150 may include a coreless fiber 154 that is spliced onto optical fiber 150 such that coreless fiber 154 contacts end face 150A of optical fiber 150. In particular, coreless fiber 154 is spliced onto end face 150A of optical fiber 150; then, coreless fiber 154 is cleaved to leave a desired length of coreless fiber on optical fiber 150. The presence of coreless fiber 154 expands the mode field diameter of optical fiber 160. Similar to the method described with respect to glass substrate 125, laser beam 106 is applied onto an end face 154A of coreless fiber 154 such that a lens 151 is applied onto end face 154A of coreless fiber 154 via the methods described herein. In some embodiments, coreless fiber 154 is made of substantially the same materials of respective claddings of optical fiber(s) 150. In some embodiments, coreless fiber 154 has a refractive index of about 1.44 at a reference wavelength of 1550 nm.

Referring back to FIG. 6B, optical fiber 150 and connector 160 are placed and held onto stage 120 where laser beam as emitted by laser 102 is applied onto end face 154A of coreless optical fiber 154 of optical fiber 150. As also mentioned previously, laser beam 106 can be tuned such that the wavelength of the laser beam 106 can be adjusted depending on the application for optical fiber 150. In some embodiments, laser apparatus 100 is configured such that laser beam 106 has a wavelength ranging between 2 microns and 3 microns or between 2.65 microns and 2.85 microns. When applied onto end face 154A of coreless optical fiber 154, laser beam 106 with these wavelengths can treat end face 154A such that a lens 151 is formed as shown in FIG. 6B. Lens 151 formed on end face 154A of coreless fiber 154 is configured to collimate an expanded beam through optical fiber 150 after which the expanded beam then connects with another lensed connector. While the above disclosure with respect to FIG. 6B is directed to an embodiment where a coreless fiber 154 is used with optical fiber 150 in lensed connector 160, it is within the scope of the present disclosure that the same process can be used onto an end face 150A of optical fiber 150 to create a lens 151 onto optical fiber 150 as shown in FIG. 7A.

Lens 151 as formed onto optical fiber 150 or coreless optical fiber 154 has the same properties (e.g., height, width, etc.) as lens 151 formed onto glass substrate 125 except as noted herein. In some embodiments, lens 151 as applied directly onto optical fiber 150 (or coreless optical fiber 154) (see FIGS. 7A and 7B) has a radius of curvature that is greater than a diameter of optical fiber 150. In some embodiments, lens 151 as applied directly onto optical fiber 150 (or coreless optical fiber 154) (see FIGS. 7A and 7B) has a ratio of radius of curvature of lens 151 to the diameter of optical fiber 150 ranging between 0.8:1 and 100:1.

In the embodiment where lens 151 is applied directly onto optical fiber 150, lens 151 and optical fiber 150 are used in physical contact connectors where the mated connectors are in a physical contact configuration with each other to transmit light through the mated connectors. In the embodiments where lens 151 is applied onto coreless optical fiber 154, lens 151 and coreless optical fiber 154 are in lensed connectors (i.e., non-physical contact) applications where mated lensed connectors are spaced apart from each other, and light is transmitted through the mated connectors.

In some embodiments with coreless fiber 154, the hydroxyl concentration of lens 151 can be controlled (i.e., increased) by omitting a chlorine dry step when consolidating outside vapor deposition silica soot blanks (i.e., fiber preform). This increases the water content of coreless fiber 154 thereby increasing hydroxyl concentration of lens 151 when applied onto coreless fiber 154. In addition, in some embodiments with coreless fiber 154, water can be added to coreless fiber 154 in addition to omitting the chlorine dry step mentioned above to further increase the hydroxyl concentration of lens 151 when applied onto coreless fiber 154.

Advantageously, lens(es) 151 is/are repeatable and symmetric raised swelling features on fiber end face for lensed connection. Also, lens(es) 151 is/are ultra-stable and ultra-precise on either an optical fiber end face or a glass substrate. Moreover, in-situ monitoring process enables precise control over structure position and profile of lens(es) 151.

To prepare a connector assembly 175 with the lens(es) 151 of the present disclosure, a laser beam 106 is first emitted from laser 102. Laser beam 106 proceeds through laser apparatus 100 (FIG. 1) as discussed above whereby, laser beam 106 is applied onto top surface 127 of glass substrate 125. As mentioned above, in some embodiments, laser beam 106 has a wavelength ranging between 2.65 microns and 2.85 microns. Laser beam 106 is applied onto top surface 127 at a particular focus offset relative to optical fiber end face 150A. In some embodiments, the focus offset of laser beam 106 ranges between −5 mm to 5 mm relative to top surface 127. In some embodiments, optical fiber 150 is laser treated under ambient temperature ranging between 10° C. and 30° C. In some embodiments, lens 151 has a hydroxyl concentration greater than 13 ppm. To prepare a connector 160 with optical fiber 150 and/or with coreless optical fiber 154, the same steps of the above mentioned method to prepare connector assembly 175 on glass substrate 125 apply.

Advantageously, the above-described method provides a high precision, repeatable and easily adjustable method for fiber end face reflow and polishing via mid IR induced laser polishing. Compared with other laser processing methods for fiber end faces, tunable mid-IR laser processing offers the flexibility and versatility over large variety of fiber materials, such as, high OH fiber for jumper connectors, low OH fiber for low profile lens or polishing, etc. That is, the mid IR laser processing can accommodate a much wider material and application selections by choosing suitable and optimized processing parameters. In addition, by selective laser exposure parameters described above, the method of the present disclosure enables a method of creating lensed fiber with tailored morphology for various connecting conditions, such as, EB lens connector, meta surface-based lens array, coreless fiber connector, tapered lensed connector, etc., for example. Moreover, the above-mentioned method of the present disclosure provides a flexible process of choosing suitable and optimized laser exposure parameters on different or customized fiber products and provides a repeatable and controllable polishing of an optical fiber end face.

Another advantage of the present disclosure is that the method of the present disclosure is adjustable to accommodate various types of lens fabrications onto a glass substrate (or optical fiber end face). With tailored temporal laser properties in combination with spatial focus distributions of various lenses within laser apparatus 100, a desired height profile and characteristics of lens 151, such as concave radius of curvature, convex, conical, wavefront corrected, angled, etc. can be achieved using controlled energy deposition through structured beam shaping of laser beam 106, including Gaussian beam, Bessel beam, Bessel-like beam, flat-top beam, annular beam, and Fresnel beam, etc.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A lensed connector comprising:

at least one optical fiber comprising an optical fiber diameter and an end face, wherein the end face includes a lens, the lens spanning the optical fiber diameter with a radius of curvature that is greater than the optical fiber diameter;

wherein the lens has a radius of curvature in the range between 10 millimeters and 25 millimeters with a hydroxyl concentration ranging between 8 parts per million (ppm) and 700 ppm and a height relative to an interface between an edge of the optical fiber and the lens, the height ranging between 0.1 microns and 50 microns with a height H to diameter D1 ratio of at least 1%.

2. The lensed connector of claim 1, wherein the end face is treated by a laser comprising a wavelength ranging between 2.65 microns and 2.85 microns to create the lens.

3. The lensed connector of claim 1, wherein the lens has a ratio of radius of curvature of the lens to the optical fiber diameter, the ratio ranging between 0.8:1 and 100:1.

4. The lensed connector of claim 1, further comprising:

a coreless fiber spliced onto the optical fiber, wherein the lens is applied onto the coreless optical fiber.

5. The lensed connector of claim 1, wherein the lens has a hydroxyl concentration greater than 13 ppm.

6. A method of preparing a lensed connector wherein the lensed connector includes an optical fiber having an optical fiber diameter and an end face comprising:

applying a laser beam onto the end face of the optical fiber for creating a lens on the end face of the optical fiber;

wherein the laser beam has a wavelength ranging between 2.65 microns and 2.85 microns; and wherein the lens spans the optical fiber diameter with a radius of curvature that is greater than the optical fiber diameter and in the range between 10 millimeters and 25 millimeters with has a hydroxyl concentration ranging between 8 parts per million (ppm) and 700 ppm and a height relative to an interface between an edge of the optical fiber and the lens, the height ranging between 0.1 microns and 50 microns with a height H to diameter D1 ratio of at least 1%.

7. The method of claim 6, wherein the lens has a hydroxyl concentration greater than 13 parts per million (ppm).

8. The method of claim 6, wherein the laser beam has a power ranging between 1 Watts (W) and 50 W.

9. The method of claim 6, wherein the laser beam has a numerical aperture ranging between 0.02 and 0.3.

10. The method of claim 6, wherein the laser beam has an exposure time ranging between 0.1 seconds to 10 seconds.

* * * * *